United States Patent

Junge et al.

[11] 4,052,377
[45] Oct. 4, 1977

[54] MONOAZO DYE HAVING A β-HYDROXYNAPHTHOIC ACID AMIDE COUPLING COMPONENT

[75] Inventors: Helmut Junge, Wachenheim; Walter Kurtz, Ludwigshafen, both of Germany

[73] Assignee: BASF Aktiengesellschaft, Ludwigshafen, Germany

[21] Appl. No.: 680,918

[22] Filed: Apr. 28, 1976

[30] Foreign Application Priority Data

May 10, 1975 Germany .............................. 2520896

[51] Int. Cl.² .................... C09B 29/20; C09B 29/22; D06P 1/44; D06P 1/52

[52] U.S. Cl. ....................... 260/154; 106/23; 106/288 Q; 260/37 R; 260/38; 260/39 P; 260/152; 260/157; 260/192; 260/204; 260/251 QA

[58] Field of Search .......................................... 260/154

[56] References Cited

U.S. PATENT DOCUMENTS

| | | | |
|---|---|---|---|
| 3,113,938 | 12/1963 | Nakaten et al. | 260/204 |
| 3,118,870 | 1/1964 | Dietz et al. | 260/154 |
| 3,719,657 | 3/1973 | Hama et al. | 260/154 |

*Primary Examiner*—Floyd D. Higel
*Attorney, Agent, or Firm*—Keil, Thompson & Shurtleff

[57] ABSTRACT

A monoazo dye or pigment of the formula:

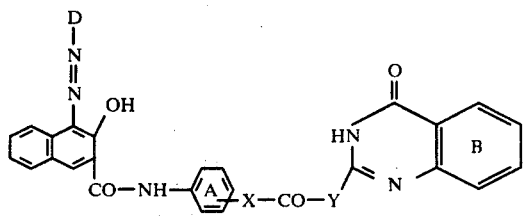

in which
D is the radical of the diazo component, preferably a diazotized compound of the aminoanthraquinone, aminophthalimide or aniline series;
X is —NH or a direct bond; and
Y is —NH, —CONH, —NHCO or a direct bond; and
wherein the rings A and B may contain from one to three substituents such as chloro, bromo, methyl, ethyl, methoxy, ethoxy, cyano, nitro, alkoxycarbonyl, trifluoromethyl, methylsulfonyl and optionally N-substituted carbamoyl or sulfamoyl radicals. The dyes or pigments are eminently suitable for coloring for example printing inks, surface coatings and resins because of their color strength and very good fastness properties.

6 Claims, No Drawings

MONOAZO DYE HAVING A β-HYDROXYNAPHTHOIC ACID AMIDE COUPLING COMPONENT

The invention relates to an azo dye or pigment of the formula (I):

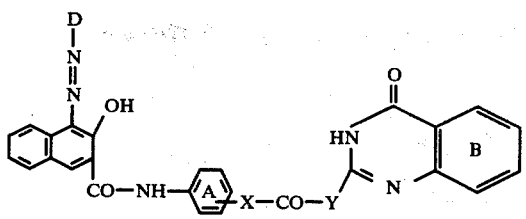

in which

D is the radical of a diazo component;
X is —NH— or a direct bond;
Y is —NH—, —CONH—, —NHCO— or a direct bond; and the rings
A and B optionally bear from one to three substituents.

The invention relates particularly to a dye of the formula (I):

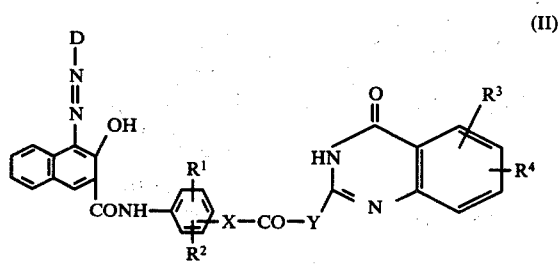

in which
D is the radical of a diazo component;
X is a direct bond and Y is —NH— or
X is —NH— and Y is a direct bond; and
$R^1$, $R^2$, $R^3$ and $R^4$ are hydrogen, chloro, bromo, methyl, ethyl, methoxy, ethoxy, cyano, nitro, alkoxycarbonyl of one to four carbon atoms, trifluoromethyl, methylsulfonyl or optionally N-substituted carbamoyl or sulfonyl.

Examples of N-substituted carbamoyl are N-methyl, N-phenyl, N-(chloro, bromo, methyl, methoxy, ethoxy or carbomethoxy)-phenyl and N-naphthylcarbamoyl. The corresponding sulfamoyl radicals are also suitable.

Preferred diazo components are compounds of the aminoanthraquinone, aminophthalimide or aniline series.

Examples of suitable diazo components D are diazotizable aromatic amines such as: 1-aminoanthraquinone, 3-amino-N-phenylphthalimide, 2,5-dichloroaniline, 2,4,5-trichloroaniline, 3,4-dichloroaniline, 2-chloroaniline, o-nitroaniline, 2-chloro-4-nitroaniline, 2-amino-5-nitrobenzonitrile, 2-methyl-4-nitroaniline, 2-methyl-5-nitroaniline, 2-nitro-4-methylaniline, 2-methoxy-4-nitroaniline, 3-amino-4-methoxybenzonitrile, 4-chloro-2-nitroaniline, 2-chloro-5-nitroaniline, 4-chloro-3-nitroaniline, 2-amino-5-chlorobenzonitrile, 4-chloro-2-methylsulfonylaniline, methyl 2-aminobenzoate, dimethyl 2-aminoterephthalate, diethyl 2-aminoterephthalate, methyl 2-amino-4-carbamoylbenzoate, dimethyl 3-aminoisophthalate, 3-amino-4-chlorobenzonitrile, isobutyl 3-amino-4-methylbenzoate, 2-(3-phenyloxdiazolyl-1,2,4)-aniline, 2-(3-phenyloxdiazolyl-1,2,4)-4-nitroaniline, 2-(2-phenyl-oxdiazolyl-1,3,4)-aniline and 2-(2-phenyloxdiazolyl-1,3,4)-4-nitroaniline.

The new dyes may be prepared by conventional methods for example:

a. by condensing a carboxylic acid halide of formula (III):

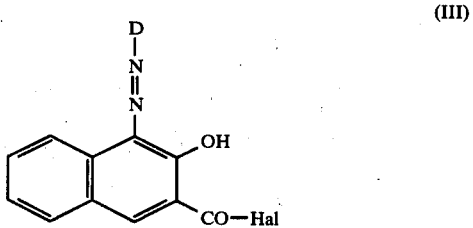

in which:
Hal is chloro or bromo
with an amine of formula (IV):

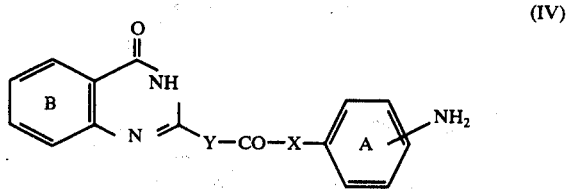

or b. by coupling the diazo compound of an amine of formula (V):

$$D-NH_2 \qquad (V)$$

with a coupling component of formula (VI):

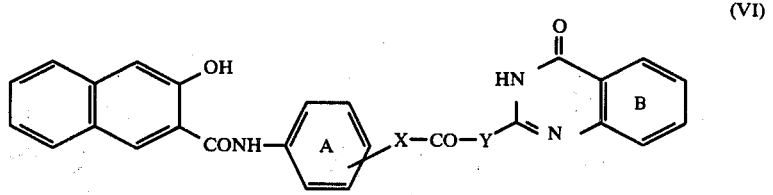

D, X and Y have the meanings given above and the rings A and B may bear substituents as stated above.

Azo dye carboxylic acids based on the azo dye acid halides (III) may be prepared by a conventional method by coupling a diazonium salt of an amine (V) with β-hydroxynaphthoic acid.

The azo dye carboxylic acids thus obtained may be converted into the acid halides by a conventional method with a halogenating agent such as $POX_3$, $PX_3$, $SOX_2$ or $COX_2$ (X being halogen), preferably in an inert solvent such as nitrobenzene, a chlorinated benzene, a xylene or N-methylpyrrolidone, if desired with the addition of a catalytic amount of dimethylformamide or pyridine.

Amines of formula (IV) in which Y is a direct bond and X is —NH— may be prepared for example by condensation of a quinazolone-(4)-2-carboxylic acid ester with a nitroaniline followed by reduction. Phenylenediamines may also be used immediately instead of nitranilines provided their substituents permit a reaction clearly leading to only one product.

Amines of formula (IV) in which X is a direct bond and Y is —NH— are conveniently accessible synthetically by acylation of 2-aminoquinazolone-(4) with an unsubstituted or substituted nitrobenzoyl chloride followed by reduction of the nitro group to the amino group.

Examples of amines of formula (IV) are:

1
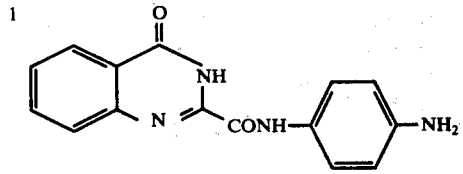

2
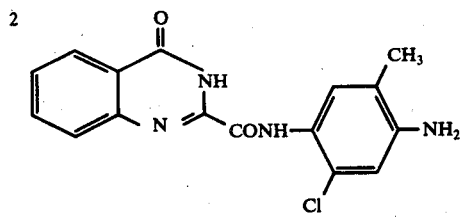

3
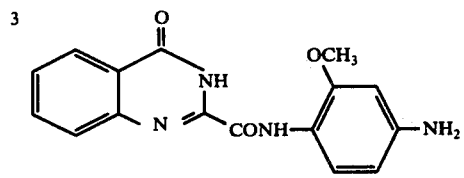

4
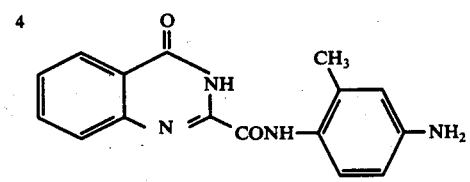

5
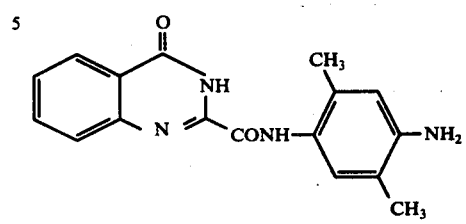

6
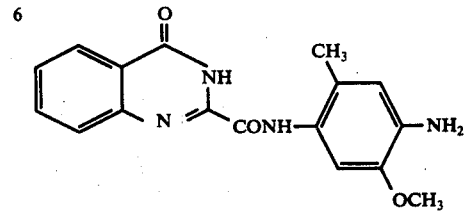

7
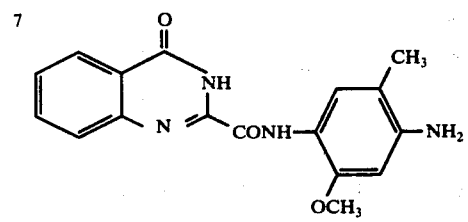

8
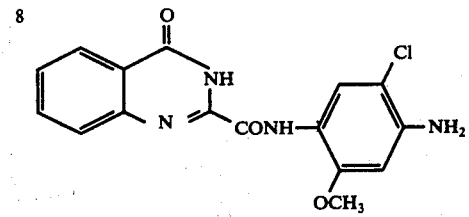

9
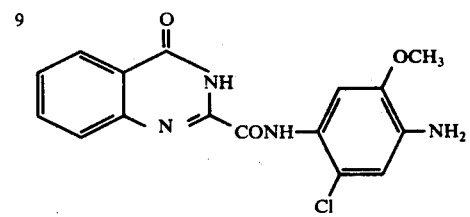

10
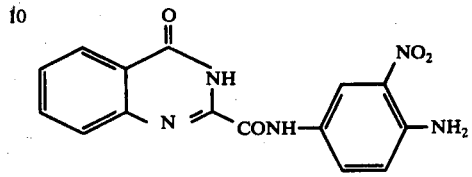

11
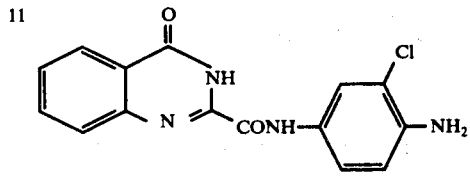

12
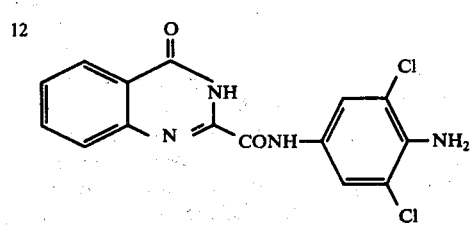

13
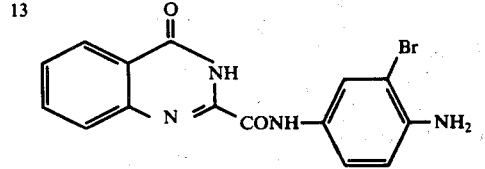

14
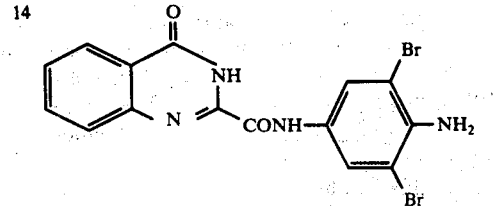

-continued
15 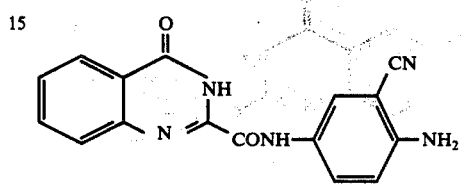 16 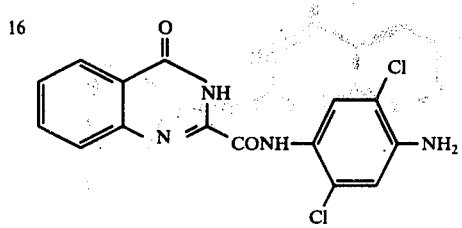
17 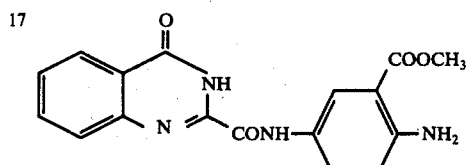 18 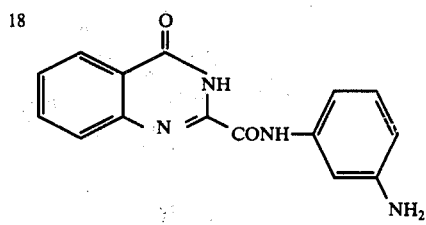
19 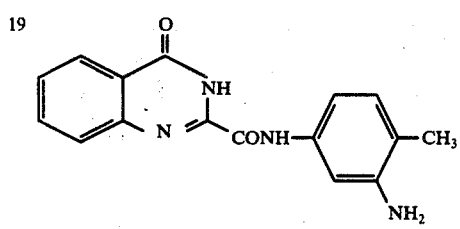 20 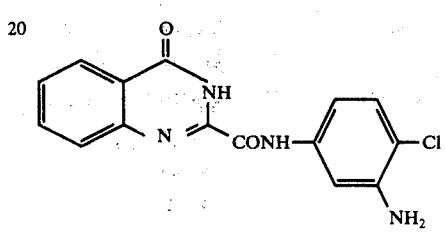
21 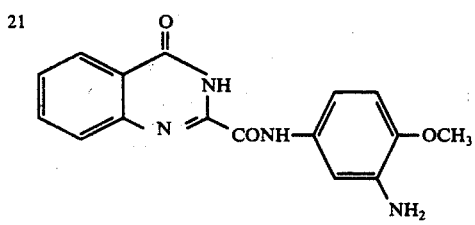 22 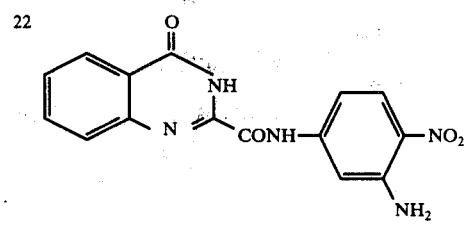
23 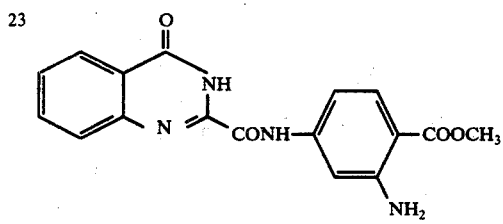 24 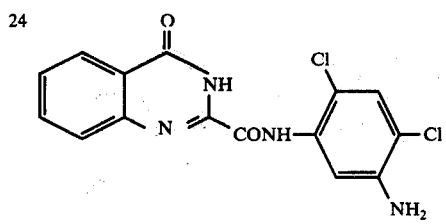
25 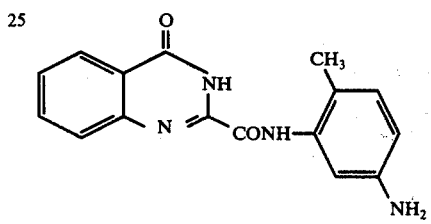 26 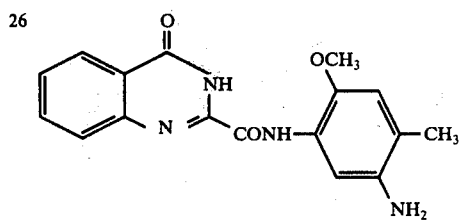
27 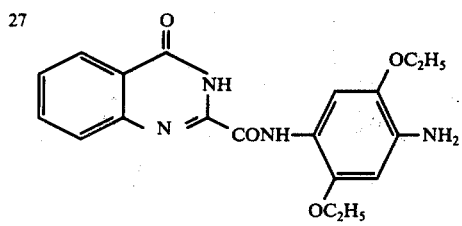 28 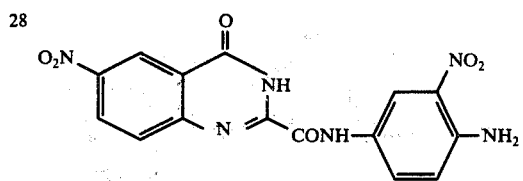

-continued
29
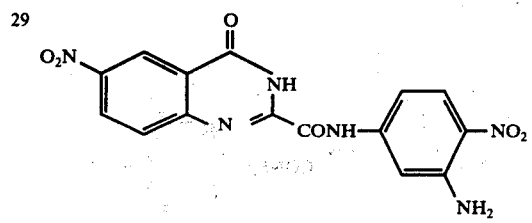
30
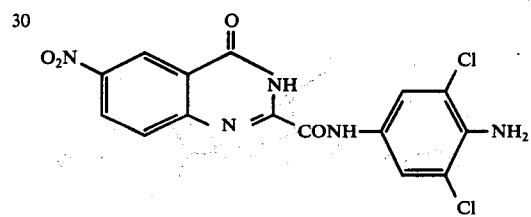
31
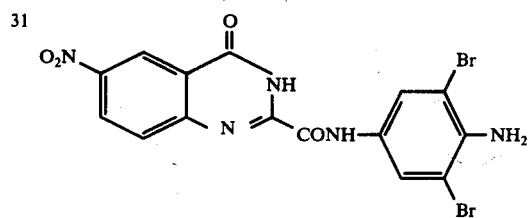
32
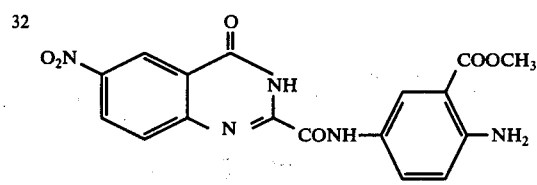
33
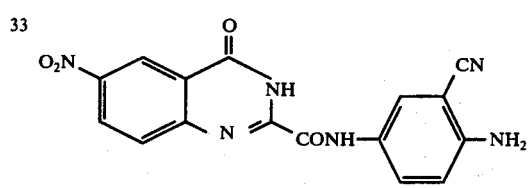
34
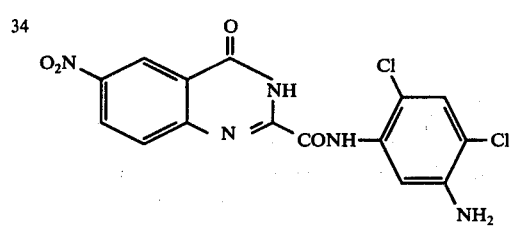
35
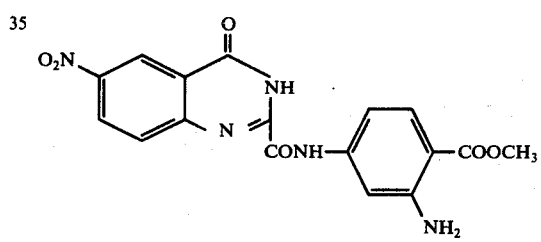
36
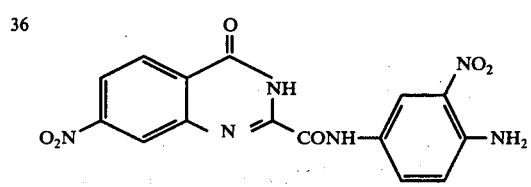
37
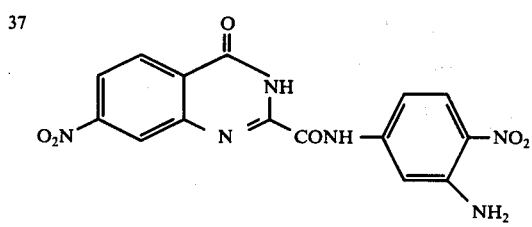
38
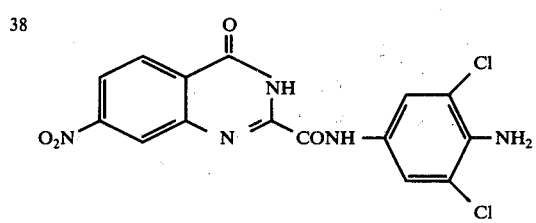
39
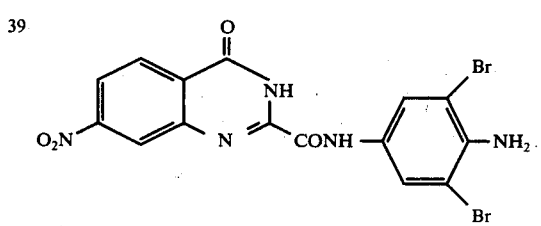
40
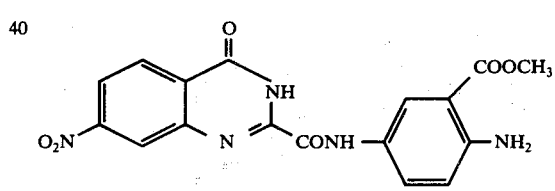
41
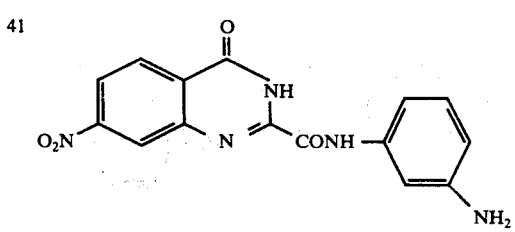
42
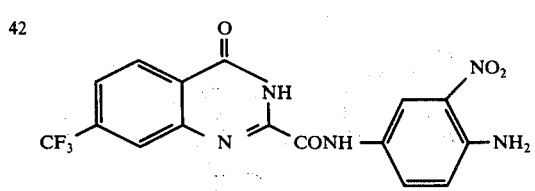

-continued
43 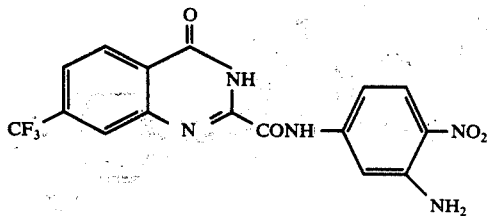
44 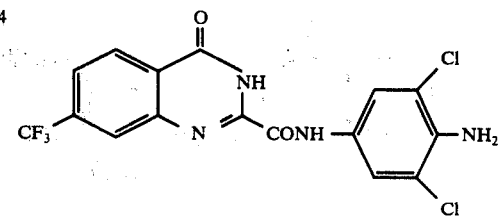
45 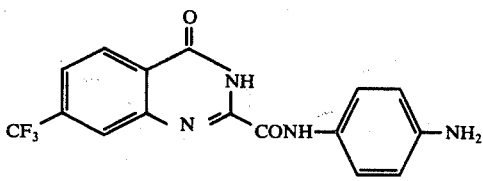
46 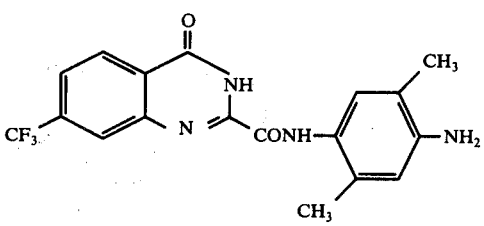
47 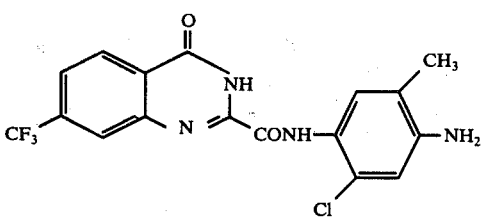
48 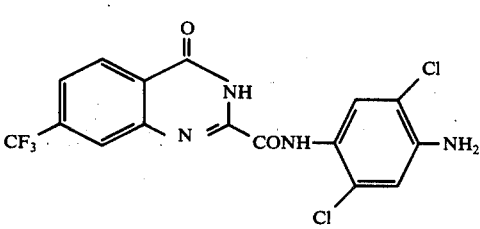
49 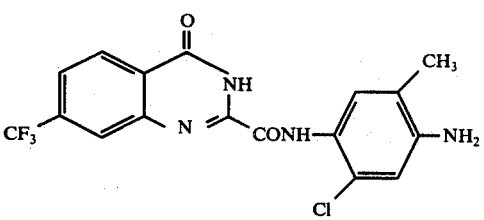
50 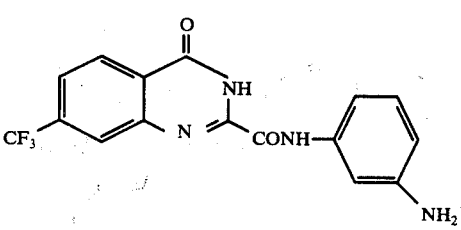
51 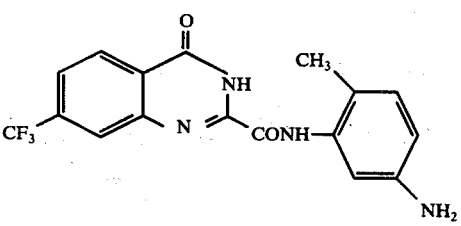
52 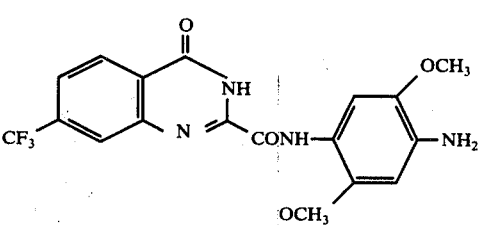
53 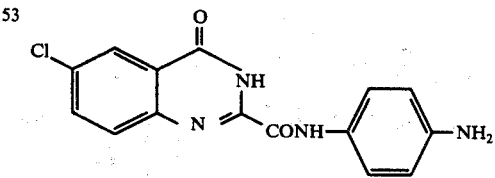
54 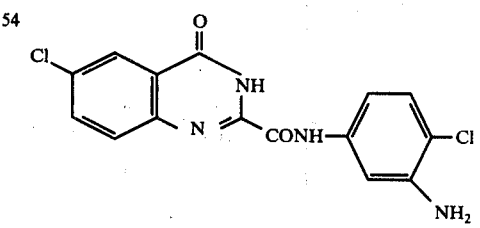
55 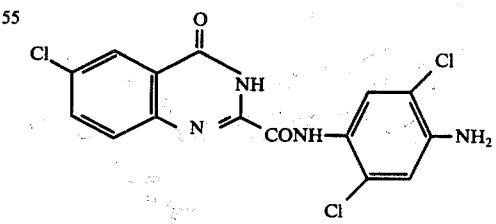
56 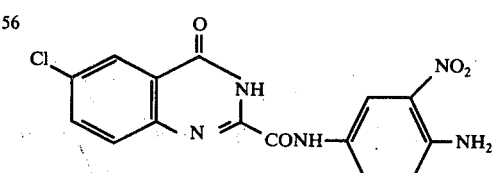

-continued
57 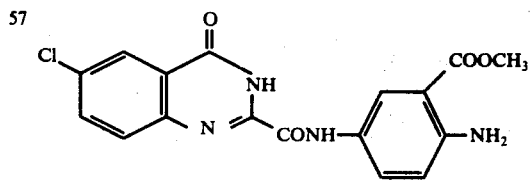
58 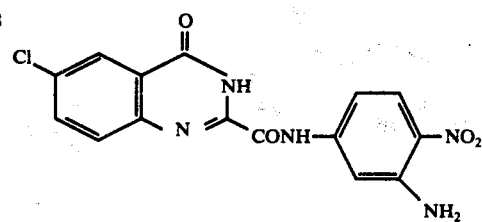
59 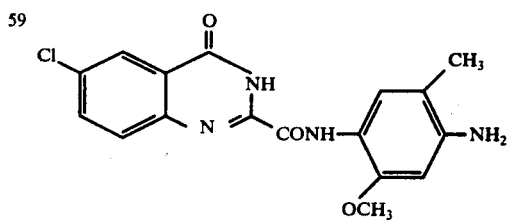
60 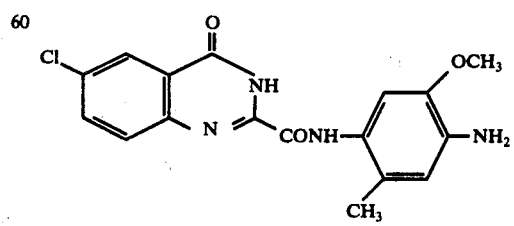
61 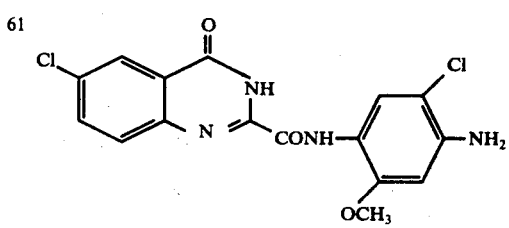
62 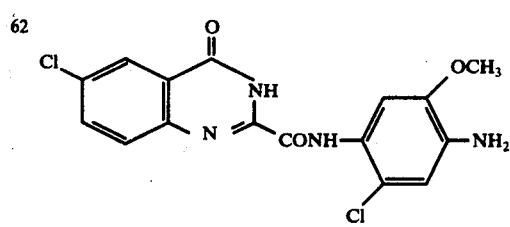
63 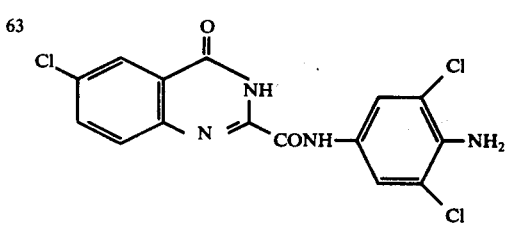
64 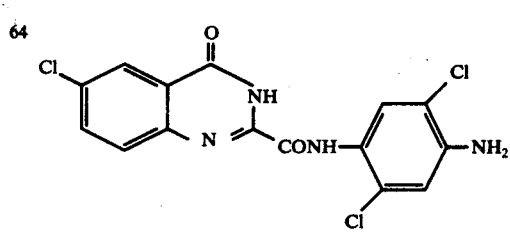
65 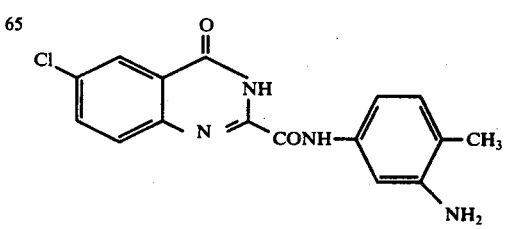
66 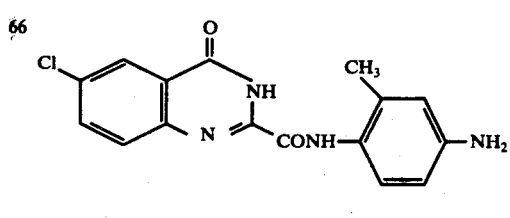
67 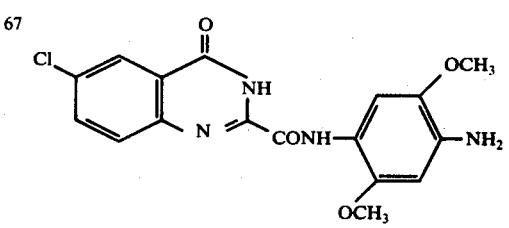
68 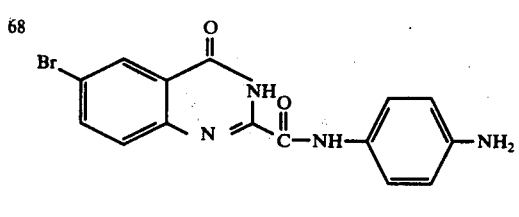
69 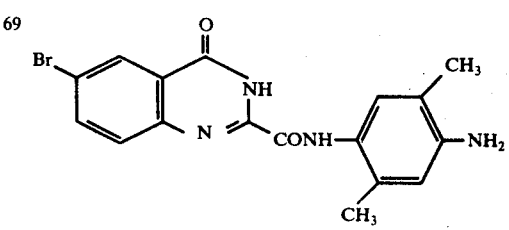
70 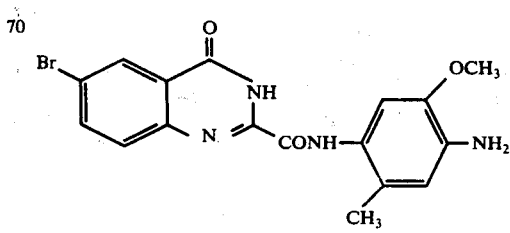

-continued
71 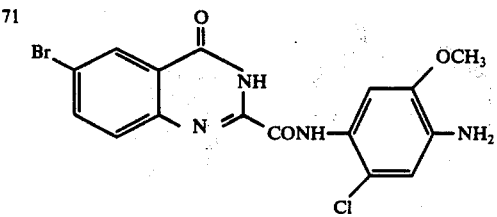
72 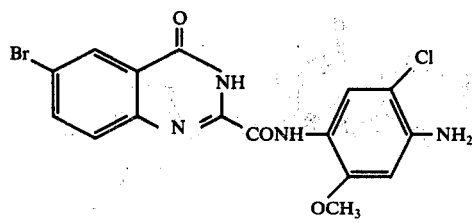
73 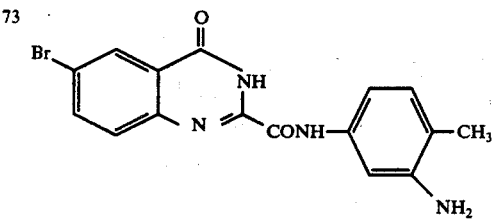
74 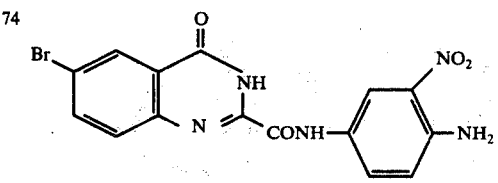
75 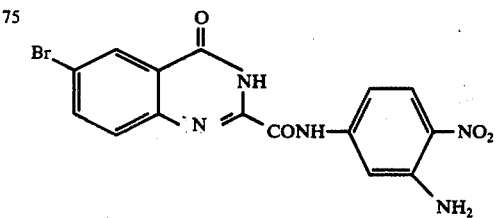
76 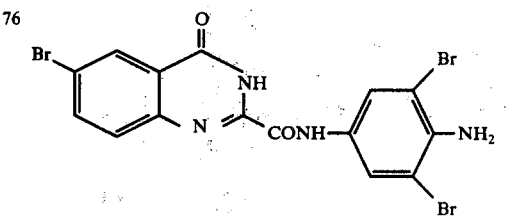
77 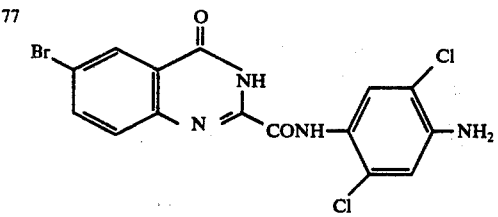
78 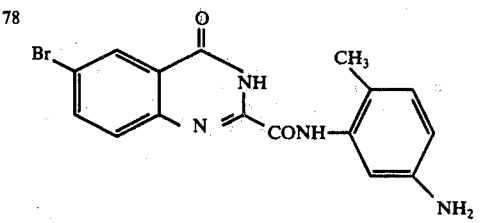
79 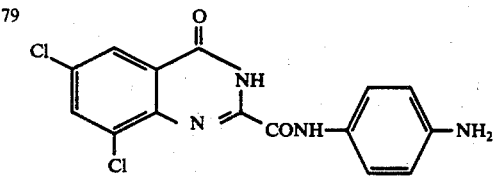
80 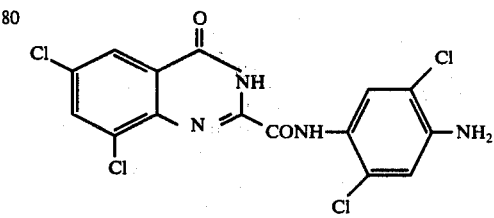
81 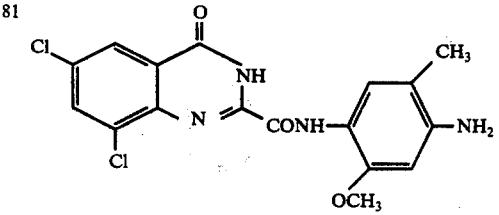
82 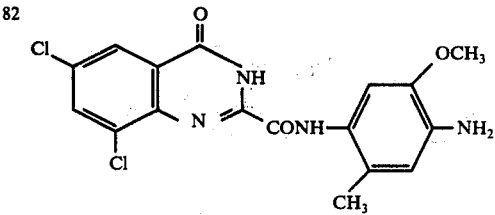
83 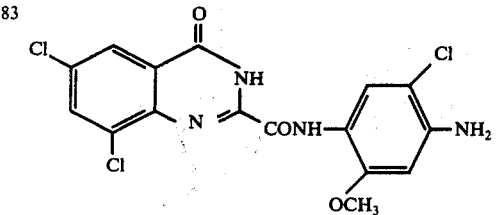
84 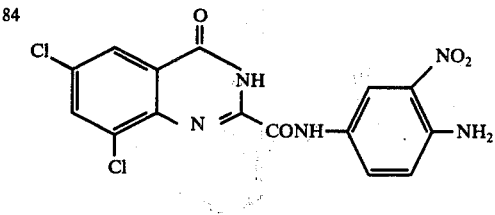

-continued
85 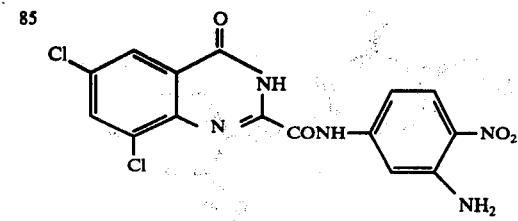
86 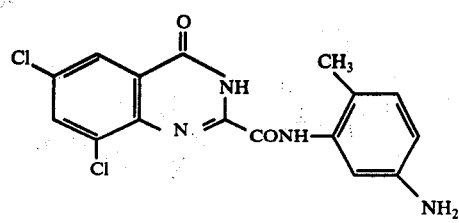
87 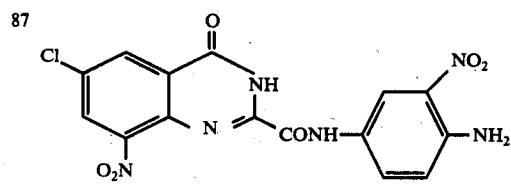
88 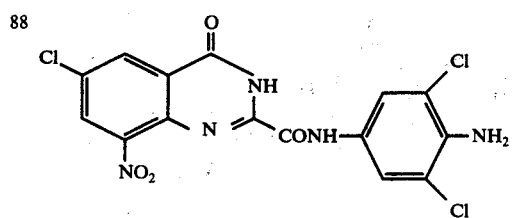
89 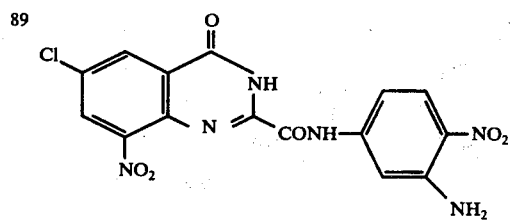
90 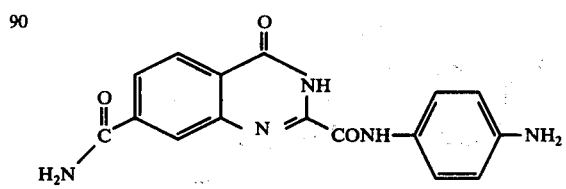
91 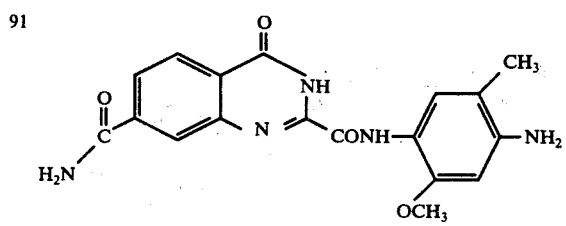
92 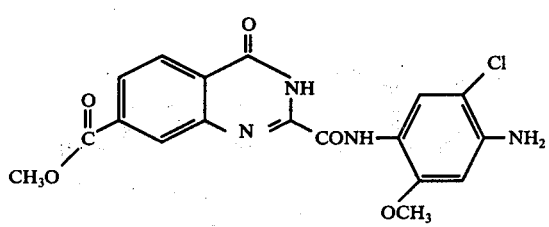
93 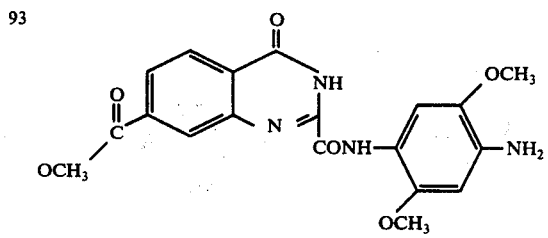
94 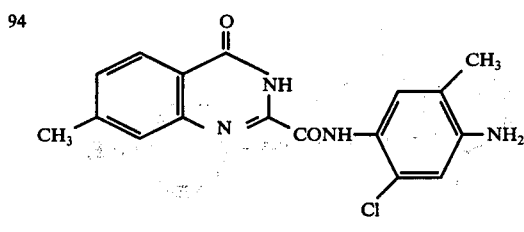
95 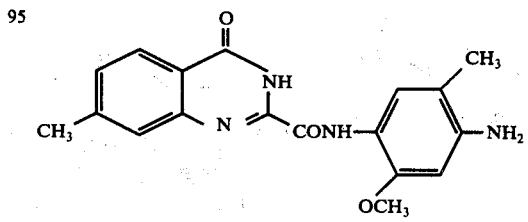
96 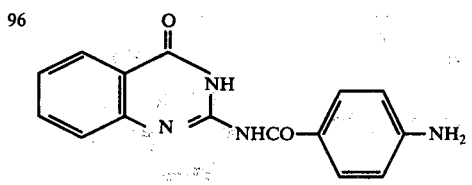
97 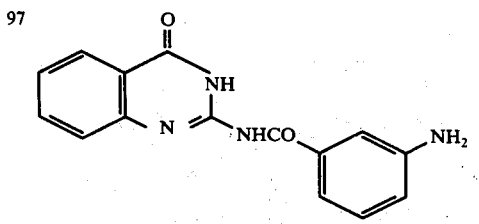
98 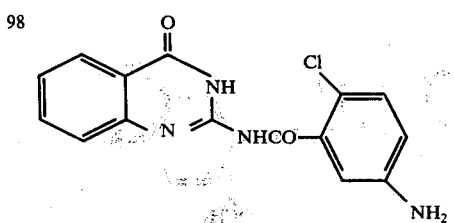

-continued
99 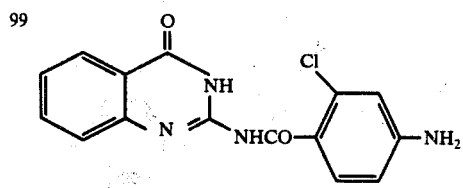
100 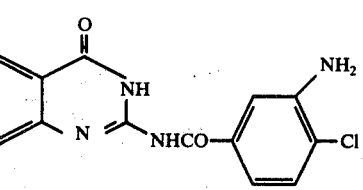
101 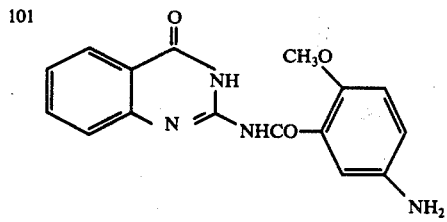
102 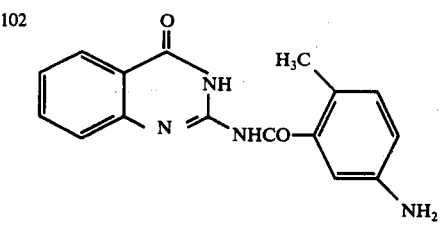
103 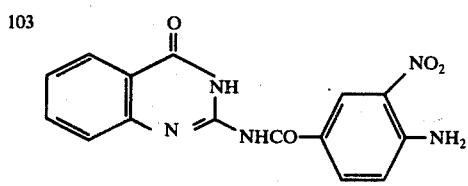
104 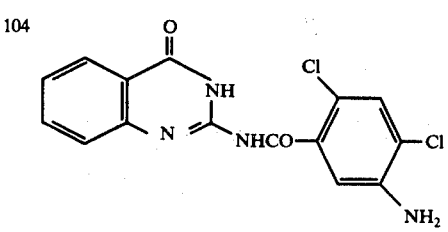
105 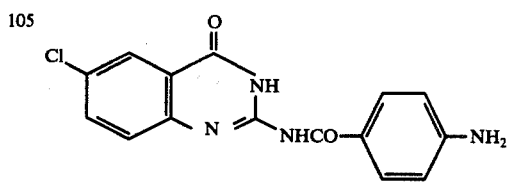
106 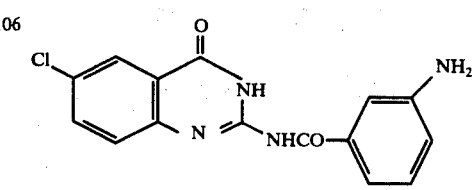
107 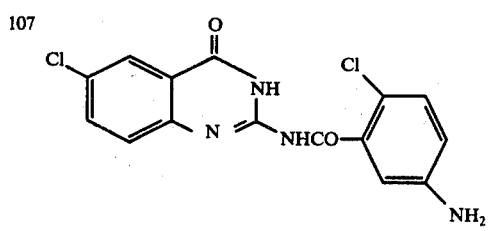
108 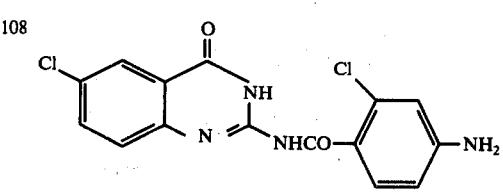
109 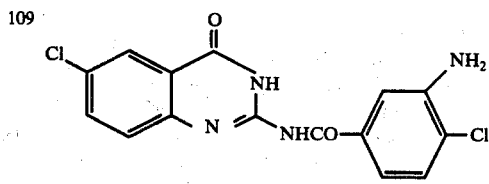
110 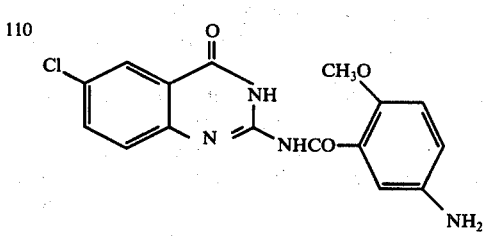
111 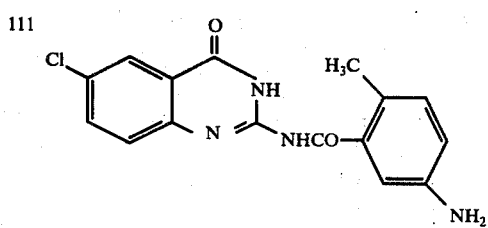
112 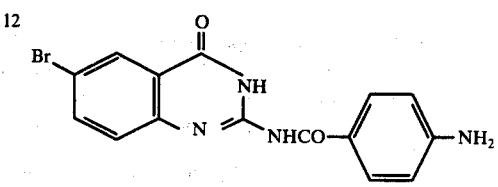
113 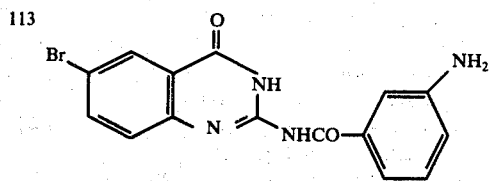
114 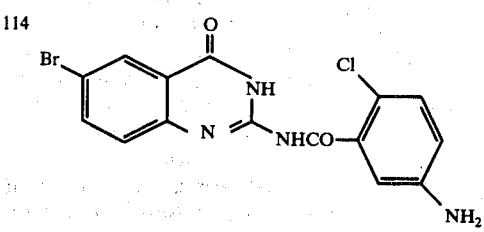

-continued

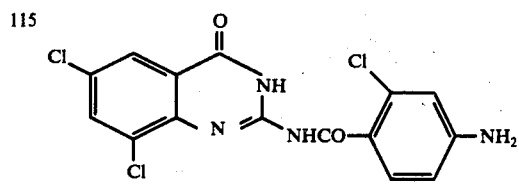

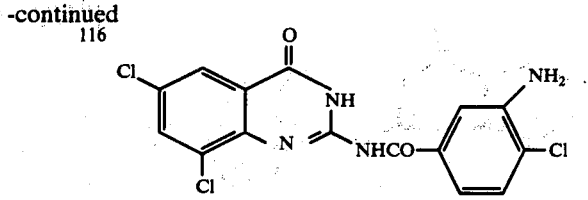

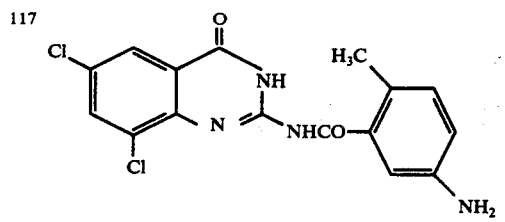

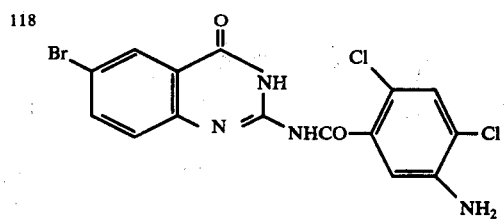

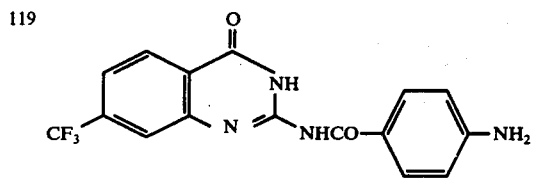

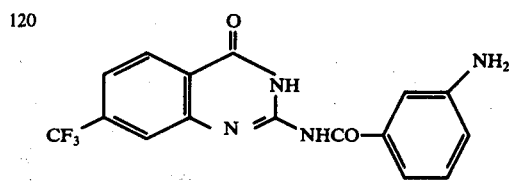

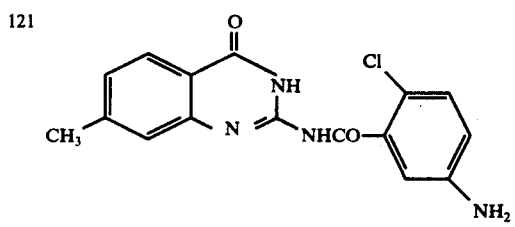

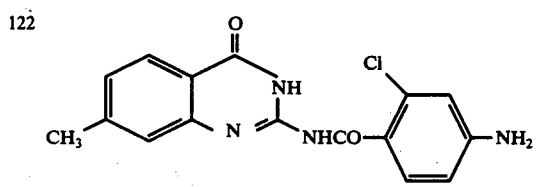

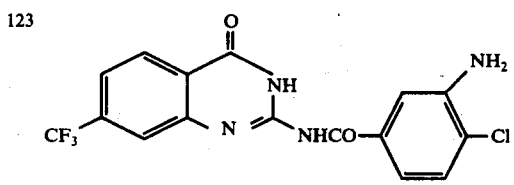

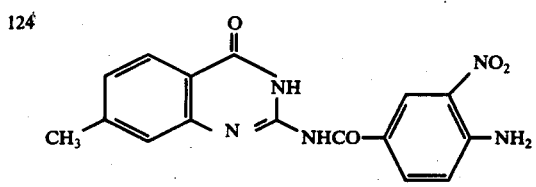

Condensation of the azo carboxylic acid halides (III) with the amines of formula (IV) is advantageously carried out in an anhydrous medium, for example by heating the components in an organic solvent such as nitrobenzene, o-dichlorobenzene, trichlorobenzene, methyl benzoate, xylene, dimethylformamide, N-methylpyrrolidone and the like, and it is preferable to use acid-binding agents such as sodium acetate or pyridine or a catalytic amount of a compound which accelerates the acylation reaction such as collidine, dimethylformamide and the like.

Amines (IV) which are sparingly soluble may be dissolved in just sufficient N-methylpyrrolidone or dimethylformamide and then reacted as a solution with the azo carboxylic halide of formula (II) for example in o-dichlorobenzene.

According to modification (b) the dyes (I) according to the invention are obtained when a diazotized amine of formula (V) is combined by a conventional method with a coupling component of formula (VI).

Coupling components of formula (VI) are obtained for example by condensation of 2-hydroxynaphthalene-3-carboxylic acid with an amine of formula (IV) in the presence of a chlorinating agent, as for example phosphorus trichloride or thionyl chloride.

The coupling is conveniently carried out by bringing together an aqueous-alkaline solution of the coupling component (IV) (or a very finely divided suspension of the coupling component (IV) in water with or without the addition of an organic solvent) with an acid solution of the diazotized amine (V). A pH range of from 4 to 7, advantageously set up by adding a buffer substance, for example sodium acetate, and the addition of wetting or dispersing agents, for example an aralkyl sulfonate, facilitates a uniform course of the reaction.

The coupling reaction may also take place wholly or partly in an organic solvent such as methanol, isopropanol, glacial acetic acid or dimethylformamide.

The pigment dyes according to the invention are obtained in this way in a very pure chemical condition but sometimes not in the optimal physical form for all purposes for which they are used. They may be brought into a form adapted to the particular purpose by the usual measures such as comminution, salt grinding or recrystallization.

The new pigments may be used for mass coloration, for example of viscose, for the production of colored print pastes for letterpress printing or offset printing, for the production of colored surface coatings, for example nitrocellulose lacquers, acrylate lacquers, melamine resin lacquers or alkyd resins, for coloring phenolic resins or amino plastics or of thermoplastics such as polystyrene, polyolefins or polyvinyl chloride, of rubber or silicone resins, for coloring laminated paper or board and for textile printing. They are distinguished for example by high color strength, fastness to light, fastness to overspraying, fastness to plasticizers and insolubility in organic solvents.

Particular technical importance attaches to dyes of the formula:

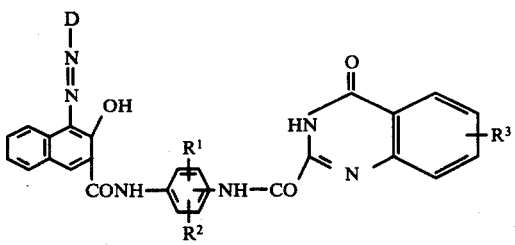

in which

D is phenyl bearing fluoro, chloro, bromo, trifluoromethyl, methyl, ethyl, methoxy, ethoxy, alkoxycarbonyl of one to four carbon atoms, cyano or nitro as a substituent, phthalimidyl; phthalimidyl bearing methyl, ethyl, phenyl, or phenyl bearing chloro, bromo, methyl, ethyl, methoxy or ethoxy as a substituent, as a substitutent on the nitrogen atom; anthraquinonyl; or anthraquinonyl bearing chloro or bromo as a substituent;

$R^1$ is hydrogen, chloro, bromo, methyl or methoxy;

$R^2$ is hydrogen, chloro, bromo, methyl or methoxy; and $R^3$ is hydrogen, chloro, bromo, methyl, trifluoromethyl or nitro.

Particularly preferred radicals D are phenyl bearing chloro, bromo, methoxycarbonyl, ethoxycarbonyl, methyl or methoxy as a substituent, N-phenylphthalimidyl and 1-anthraquinonyl.

The following Examples illustrate the invention. Parts, unless otherwise stated, are parts by weight and percentages are percentages by weight. The temperatures are given in ° Centigrade.

EXAMPLE 1

350 parts of the dye obtained by coupling diazotized 2,5-dichloroaniline with 2-hydroxynaphthoic acid-3 is heated slowly (within 2 hours) to 110° C with 1500 parts of nitrobenzene, 236 parts of thionyl chloride and 2 to 5 parts of dimethylformamide and then left for another two hours at this temperature. Excess thionyl chloride is removed at subatmospheric pressure and the crystalline azo carboxylic acid chloride precipitated from the cooled reaction mixture is suction filtered, washed with a little benzene and then with cyclohexane and dried at 80° C at subatmospheric pressure. 295 parts of a red crystalline powder is obtained. Analysis: Cl: calculated 28.35%, found 27.9%.

7.6 parts of this acid chloride is introduced into a solution of 5.6 parts of the amine of the formula:

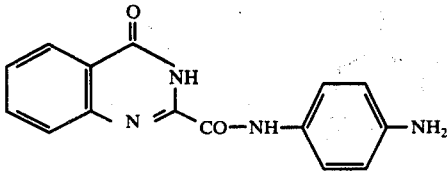

in 200 parts of nitrobenzene and 2 parts of dimethylformamide which is then heated within one dhour to 110° C, kept at this temperature for 2 hours and then heated for another two hours at 130° C. After it has been cooled to 100° C the whole is suction filtered and the filtered material is washed with nitrobenzene and methanol until the filtrate running away is clear, and then dried at 60° C at subatmospheric pressure. 10.1 parts of a red dye having very good fastness to solvents and light is obtained. The pigment has the formula:

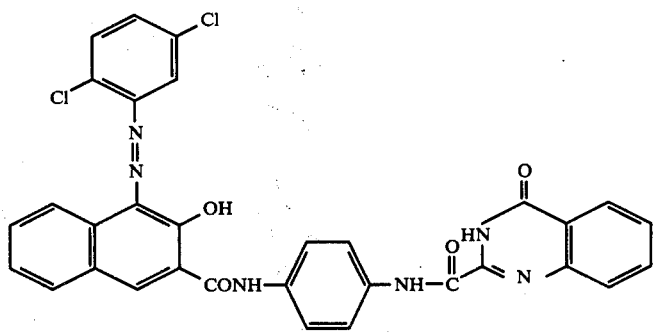

EXAMPLE 2

237 parts of the dye obtained by coupling diazotized 2,4,5-trichloroaniline and 2-hydroxynaphthalic acid-3 is heated to 110° C within two hours with 500 parts of nitrobenzene, 142 parts of thionyl chloride and 2 parts of dimethylformamide and then kept for another two hours at this temperature. The excess thionyl chloride is removed in vacuo. The uniformly crystalline azocarboxylic acid chloride precipitated on cooling is suction filtered, washed first with warm nitrobenzene and then with cyclohexane and dried at 80° C at subatmospheric pressure. 195 parts of dark red crystals are obtained. Analysis: Cl calculated 34.3%, found 34.1%.

20.7 parts of the acid chloride thus obtained is added at 60° C to 12.5 parts of the amine of the formula:

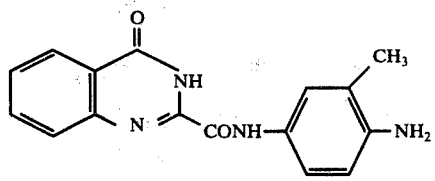

in 200 parts of o-dichlorobenzene and 2 parts of dimethylformamide, the whole heated within 2 hours to 110° C and heated for another 2 hours at 130° C. After the whole has been cooled to 100° C the product is suction filtered, washed with warm o-dichlorobenzene, dimethylformamide and methanol until the filtrate running away is clear and then dried at 60° C at subatmospheric pressure. 23.9 parts of a red pigment powder having the formula:

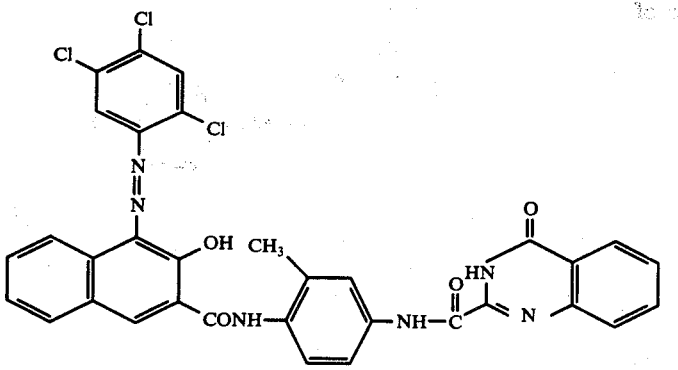

is obtained; it has high lightfastness.

EXAMPLE 3

211 parts of the dye obtained by coupling diazotized 1-aminoanthraquinone with 2-hydroxynaphthoic acid-3 is heated with 1300 parts of nitrobenzene, 90 parts of thionyl chloride and 5 parts of dimethylformamide for four hours at from 100° to 110° C while stirring. Excess thionyl chloride is removed in vacuo and the uniformly crystalline azo dye carboxylic acid chloride is suction filtered, washed with 300 parts of nitrobenzene and then with 1000 parts of cyclohexane and dried at 80° C at subatmospheric pressure. 195 parts of a red crystalline powder is obtained. Analysis: Cl calculated 8.05%, found 7.9%.

66 parts of the acid chloride thus obtained is heated with 52 parts of the amine of the formula:

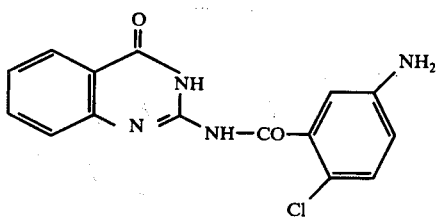

in 350 parts of nitrobenzene within one hour to 130° C and kept at this temperature for another four hours. The whole is then cooled to 60° C and suction filtered. The filtered product is washed with nitrobenzene, methanol and then with water and dried. 85 parts of a markedly bluish red pigment is obtained which is practically insoluble in the usual solvents. The pigment has the formula;

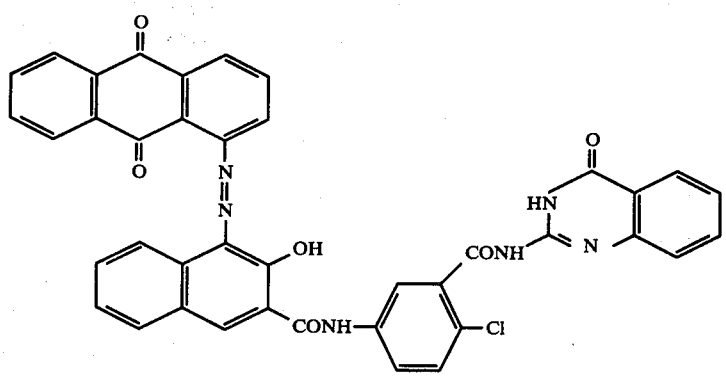

Analysis: N calculated 11.7%, found 11.8%. cl EXAMPLE 4

140 parts of the dye obtained by coupling diazotized 3-amino-N-phenylphthalimide with 2-hydroxynaphthoic acid-3 is heated within an hour to 110° with 400 parts of nitribenzene, 60 parts of thionyl chloride and 5 parts of dimethylformamide and then kept for another three hours at this temperature. The excess thionyl chloride is removed at subatmospheric pressure. The uniform azo dye acid chloride formed on cooling is suction filtered, washed with 200 parts of nitrobenzene and then with 1000 parts of cyclohexane and dried at 80° C at subatmospheric pressure. 130 parts of a red powder is obtained. Analysis: Cl calculated 7.8%, found 7.6%.

68.3 parts of the acid chloride thus obtained and 51.9 parts of an amine of the formula:

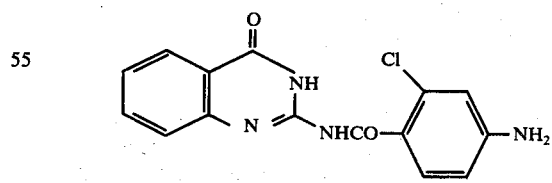

are introduced into 350 parts of dimethylformamide. The whole is heated within one hour to 110° C and the mixture is kept for another 3 hours at 130° C. After cooling it is suction filtered, washed with dimethylformamide and methanol and dried. 86 parts of a red powder having very good fastness to solvents is obtained.

The pigment has the formula:

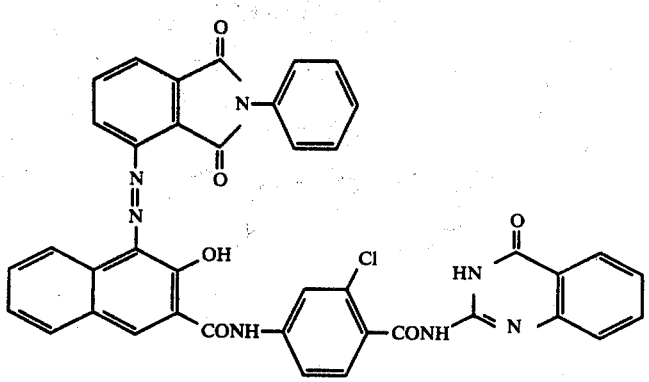

Analysis: Cl calculated 4.8%, found 4.7%.

Other monoazo pigments are obtained with the components in the following Table when 1 mole of the diazo compound of the amine specified in column I is coupled with 1 mole of 2-hydroxynaphthoic acid-(3), and the monoazo dye carboxylic acid obtained is converted into the acid chloride and condensed with 1 mole of the amine specified in column II.

Column III gives the hue of a coating prepared with the pigment obtained.

| Ex. | I | II | III |
|---|---|---|---|
| 5 | 2,5-dichloroaniline | 2 | red |
| 6 | " | 3 | red |
| 7 | " | 10 | red |
| 8 | " | 11 | red |
| 9 | " | 12 | red |
| 10 | " | 16 | red |
| 11 | " | 18 | red |
| 12 | " | 19 | red |
| 13 | " | 20 | red |
| 14 | " | 24 | red |
| 15 | " | 25 | red |
| 16 | " | 28 | maroon |
| 17 | " | 30 | red |
| 18 | " | 35 | red |
| 19 | " | 44 | red |
| 20 | " | 46 | maroon |
| 21 | " | 53 | red |
| 22 | " | 54 | red |
| 23 | " | 58 | red |
| 24 | " | 64 | red |
| 25 | " | 65 | red |
| 26 | " | 66 | red |
| 27 | " | 68 | red |
| 28 | " | 76 | red |
| 29 | " | 84 | red |
| 30 | " | 90 | red |
| 31 | " | 96 | red |
| 32 | " | 97 | red |
| 33 | " | 98 | maroon |
| 34 | " | 99 | red |
| 35 | " | 100 | maroon |
| 36 | " | 105 | red |
| 37 | 2,4,5-trichloroaniline | 1 | red |
| 38 | " | 3 | red |
| 39 | " | 4 | red |
| 40 | " | 5 | red |
| 41 | " | 6 | maroon |
| 42 | " | 8 | red |
| 43 | " | 10 | red |
| 44 | " | 11 | red |
| 45 | " | 12 | red |
| 46 | " | 13 | red |
| 47 | " | 16 | red |
| 48 | " | 18 | red |
| 49 | " | 19 | red |
| 50 | " | 20 | red |
| 51 | " | 23 | red |
| 52 | " | 24 | red |
| 53 | " | 25 | red |
| 54 | " | 28 | maroon |
| 55 | " | 29 | red |
| 56 | " | 34 | red |
| 57 | " | 53 | red |
| 58 | 2,5-dichloroaniline (with extra Cl) | 54 | red |
| 59 | " | 58 | red |
| 60 | " | 64 | red |
| 61 | " | 68 | red |
| 62 | " | 73 | red |
| 63 | " | 74 | red |
| 64 | " | 79 | red |
| 65 | " | 86 | red |
| 66 | " | 96 | red |
| 67 | " | 97 | red |
| 68 | " | 98 | red |
| 69 | " | 100 | red |
| 70 | " | 1 | red |
| 71 | 2,4-dichloroaniline | 3 | red |
| 72 | " | 4 | red |
| 73 | " | 10 | red |
| 74 | " | 11 | red |
| 75 | " | 12 | red |
| 76 | " | 13 | red |
| 77 | " | 18 | red |
| 78 | " | 20 | red |
| 79 | " | 24 | red |
| 80 | " | 53 | red |
| 81 | " | 54 | red |
| 82 | " | 55 | red |
| 83 | " | 63 | red |
| 84 | " | 96 | red |
| 85 | " | 97 | red |
| 86 | " | 1 | red |
| 87 | 1-aminoanthraquinone | 2 | red |
| 88 | " | 3 | red |
| 89 | " | 4 | red |
| 90 | " | 5 | red |
| 91 | " | 10 | red |
| 92 | " | 12 | red |
| 93 | " | 13 | red |
| 94 | " | 14 | red |
| 95 | " | 17 | red |
| 96 | " | 18 | red |
| 97 | " | 19 | red |
| 98 | " | 20 | red |
| 99 | " | 22 | red |
| 100 | " | 24 | red |
| 101 | " | 25 | red |
| 102 | " | 28 | red |

-continued

| Ex. | I | II | III |
|---|---|---|---|
| 103 | " | 29 | red |
| 104 | " | 30 | red |
| 105 | " | 32 | red |
| 106 | " | 34 | red |
| 107 | " | 38 | red |
| 108 | " | 50 | red |
| 109 | " | 53 | red |
| 110 | " | 55 | red |
| 111 | " | 56 | red |
| 112 | " | 58 | red |
| 113 | " | 59 | red |
| 114 | " | 68 | red |
| 115 | " | 74 | red |
| 116 | " | 76 | red |
| 117 | " | 84 | red |
| 118 | " | 90 | red |
| 119 | " | 96 | bluish red |
| 120 | " | 97 | bluish red |
| 121 | " | 99 | violet |
| 122 | " | 100 | red |
| 123 | 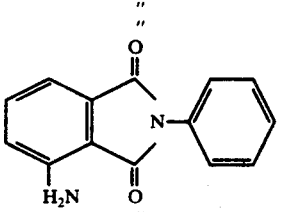 | 1 | red |
| 124 | " | 2 | maroon |
| 125 | " | 3 | maroon |
| 126 | " | 10 | red |
| 127 | " | 11 | red |
| 128 | " | 12 | red |
| 129 | " | 22 | red |
| 130 | " | 24 | red |
| 131 | " | 28 | maroon |
| 132 | " | 53 | red |
| 133 | " | 54 | red |
| 134 | " | 65 | red |
| 135 | " | 79 | red |
| 136 | " | 96 | red |
| 137 | " | 97 | red |
| 138 | " | 100 | red |
| 139 | 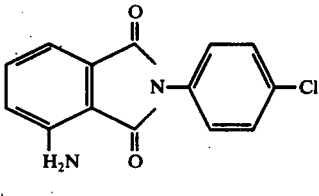 | 1 | red |
| 140 | " | 3 | maroon |
| 141 | " | 4 | red |
| 142 | " | 10 | red |
| 143 | " | 12 | red |
| 144 | " | 96 | red |
| 145 | 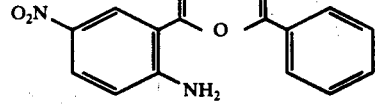 | 1 | red |
| 146 | " | 5 | red |
| 147 | " | 11 | red |
| 148 | " | 18 | red |
| 149 | " | 20 | red |

-continued

| Ex. | I | II | III |
|---|---|---|---|
| 150 | " | 28 | red |
| 151 | " | 97 | yellowish red |
| 152 | 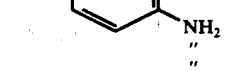 | 1 | red |
| 153 | " | 10 | red |
| 154 | " | 11 | red |
| 155 | " | 12 | red |
| 156 | " | 20 | red |
| 157 | " | 22 | red |
| 158 | " | 28 | red |
| 159 | " | 53 | red |
| 160 | " | 54 | red |
| 161 | " | 96 | red |
| 162 | 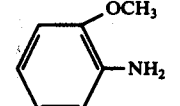 | 1 | red |
| 163 | " | 96 | bluish red |
| 164 | " | 97 | violet |
| 165 | " | 98 | violet |
| 166 | " | 99 | bluish red |
| 167 | " | 100 | bluish red |
| 168 | 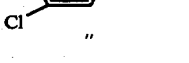 | 96 | maroon |
| 169 | " | 97 | maroon |
| 170 | " | 99 | maroon |

EXAMPLE 171

16.2 parts of 2,4-dichloroaniline is diazotized in a conventional manner in dilute hydrochloric acid with sodium nitrite; the excess of nitrite is destroyed with sulfamic acid.

45 parts of the coupling component of the formula:

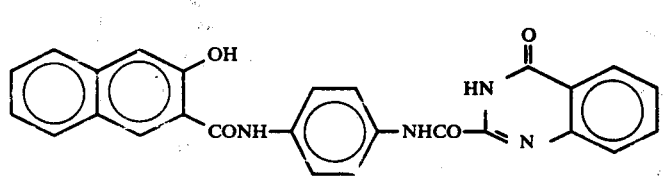

is suspended in 1500 parts of water and dissolved by adding 150 parts of dimethylformamide and 18 parts of 50% caustic soda solution. The cooled diazonium salt solution is added slowly thereto. The pH is kept at about 11 by the simultaneous addition of 20% caustic soda solution. The whole is stirred for another two hours, then heated for 1 hour at 90° C, suction filtered while hot and washed with water. The pigment paste which is still moist with water is introduced into 500 parts of dimethylformamide, heated for 3 hours at 120° C, suction filtered at 60° C, washed with methanol and dried. 50 parts of a red pigment is obtained. It has the formula:

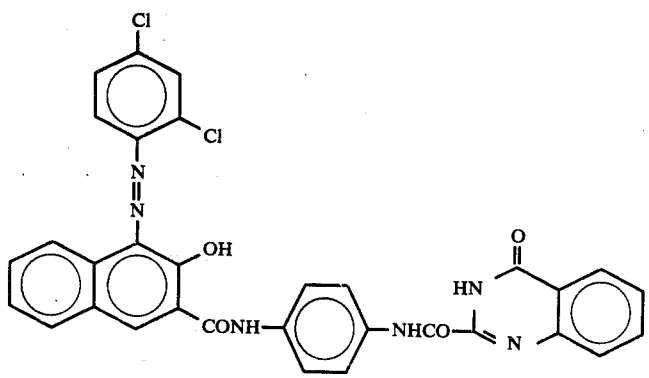

We claim:
1. A dye of the formula

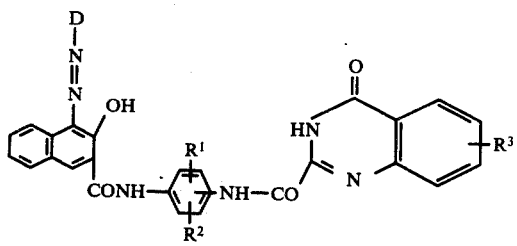

in which
D is phenyl substituted by fluoro, chloro, bromo, trifluoromethyl, methyl, ethyl, methoxy, ethoxy, $C_1$- to $C_4$-alkoxycarbonyl, cyano or nitro; phthalimidyl; phthalimidyl substituted at the nitrogen by methyl, ethyl, phenyl or phenyl substituted by chloro, bromo, methyl, ethyl, methoxy or ethoxy; anthraquinonyl; or anthraquinonyl substituted by chloro or bromo;
$R^1$ is hydrogen, chloro, bromo, methyl or methoxy,
$R^2$ is hydrogen, chloro, bromo, methyl or methoxy and
$R^3$ is hydrogen, chloro, bromo, methyl, trifluoromethyl or nitro.

2. A dye according to the formula in claim 1 in which D is phenyl substituted by chloro, bromo, methoxycarbonyl ethoxycarbonyl, methyl or methoxy, N-phenylphthalimidyl or 1-anthraquinonyl.

3. A dye according to the formula in claim 1 in which $R^1$ is hydrogen, chloro, bromo, methyl or methoxy and $R^2$ is hydrogen.

4. A dye according to the formula in claim 1 in which $R^3$ is hydrogen, chloro or bromo.

5. A dye according to the formula in claim 2 in which $R^1$ is hydrogen or methyl and $R^2$ and $R^3$ are hydrogen or chloro.

6. A dye according to claim 1 of the formula

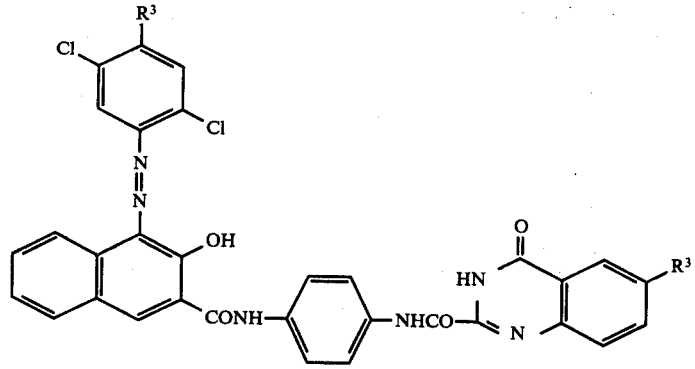

in which
$R^3$ is hydrogen or chloro.